Nov. 24, 1925.

L. F. FULLER ET AL 1,562,952

ARC CONVERTER

Filed March 16, 1921  6 Sheets-Sheet 1

Leonard F. Fuller
George C. Sweet   Inventors

By their Attorney's
Pennie, Davis, Marvin and Edmonds

Nov. 24, 1925.
L. F. FULLER ET AL
1,562,952
ARC CONVERTER
Filed March 16, 1921
6 Sheets-Sheet 5

Nov. 24, 1925.

L. F. FULLER ET AL

ARC CONVERTER

Filed March 16, 1921

Patented Nov. 24, 1925.

1,562,952

UNITED STATES PATENT OFFICE.

LEONARD F. FULLER, OF PALO ALTO, CALIFORNIA, AND GEORGE C. SWEET, OF WATERLOO, NEW YORK, ASSIGNORS, BY MESNE ASSIGNMENTS, TO WIRELESS IMPROVEMENT COMPANY, OF JERSEY CITY, NEW JERSEY, A CORPORATION OF NEW JERSEY.

ARC CONVERTER.

Application filed March 16, 1921. Serial No. 452,789.

*To all whom it may concern:*

Be it known that we, LEONARD F. FULLER and GEORGE C. SWEET, citizens of the United States, and respectively residents of the town of Palo Alto, in the county of Santa Clara and State of California, and of the town of Waterloo, in the county of Seneca and State of New York, have invented certain new and useful Improvements in Arc Converters; and we do hereby declare the following to be a full, clear, and exact description of the invention, such as will enable others skilled in the art to which it appertains to make and use the same.

The present invention has for its object the provision of a method and apparatus for converting a single phase or polyphase alternating or pulsating electric current of a given frequency to an electric current or oscillation of much higher frequency by means of an electric arc fed by the low frequency current, which arc is subjected to the action of a varying electro-magnetic field, the variations in which occur in certain definite relation to the variations or alternations of potential of the low frequency current.

Heretofore it has been customary to operate arc converters on direct current, that is, to use direct current to supply energy to the arc as well as to establish the magnetic blow-out field across it. This type of arc, employing a suitably cooled metallic positive electrode or anode, usually copper, in conjunction with a carbon cathode and operating in a suitably designed chamber containing a so-called "chamber atmosphere," usually a hydrocarbon of an explosive nature and having a tendency to deposit soot, has been utilized in practically all arc radio signaling systems to date. This type of arc is known as the Poulsen arc.

Due to the state of the development of the radio art and to the constantly increasing number of commercial radio stations operating throughout the world, an arc signaling system capable of "uni-wave" operation would be very desirable. If the arc could be extinguished and re-ignited in such a system in accordance with the dots and dashes of the signal and the power otherwise consumed in the intervening periods could be saved there would be a very substantial increase in operating efficiency. An arc capable of automatically reigniting and establishing itself would be still more desirable since it would obviate the necessity of auxiliary equipment for ignition purposes. This desirable feature, however, would require that the arc be of very short length in order that a reasonable electromotive force applied to the arc electrodes might jump or break down the gap and automatically establish an arc discharge.

The conditions necessary for the operation contemplated and described above cannot be obtained in so far as it has been able to be ascertained, with any known arrangement employing a carbon electrode, because such arcs require a much longer operating length than arcs with metallic electrodes and hence would require an impressed electromotive force of very high value for automatic or self-ignition. But arc electrodes of metal are not desirable at high powers with existing systems, because of the well known phenomenon of excessive wear if not actual disintegration of the cathode.

It is has long been recognized that metal arc electrodes possess certain marked advantages over electrodes of carbon, particularly because of their resistance to deformation, but up to the present it has been impossible to make practical use of metal arc electrodes in connection with the direct current arcs heretofore used, except in the case of the positive electrode, because of the high rate of disintegration of the negative. An alternating current arc is peculiarly adapted to the use of metal electrodes since the polarity of the electrodes is constantly changing and each electrode is negative for such a relatively short period of time that no appreciable disintegration takes place. The use of metallic electrodes also permits the operation of the arc in certain chamber atmospheres which would be impracticable with a carbon electrode arc, for example, it would not be practicable to use a carbon electrode arc with a chamber atmosphere of steam because disintegration of the hot carbon would take place. Such an atmosphere would be highly desirable because it would entirely eliminate all soot deposit and the danger of chamber explosions.

We have found, however, that because of the relation between magnetic field strength and power input to the arc, an arc operated from an alternating current supply requires a magnetic field varying with the current through the arc. If an unchanging field, such as produced by direct current, is used, it will be of proper value for maximum high frequency current output at substantially one point only of each half cycle of the low frequency alternating current supplied to the arc.

This leads to a consideration of the present invention, which may, for the convenience of description, be classified by analysis under two heads: firstly, the subjection of an arc discharge fed by alternating current to the action of a varying electro-magnetic field, the variations in which occur in phase with the variations or alternations of the impressed potential, and in so far as we have been able to ascertain, in time-phase with the current through the arc; and secondly, the use of suitably spaced metallic arc electrodes whereby an impressed alternating current potential of proper value will establish an arc between the electrodes either automatically or otherwise.

When single phase current is utilized as the source of supply in accordance with the invention, high frequency oscillations modulated or varied at the frequency of the supply circuit, may be produced. If polyphase alternating current is utilized to supply a plurality of arcs, one or more in each phase, continuous high frequency oscillations of substantially constant amplitude may be obtained. In the latter case, it will be noted that the arc converter provides a means whereby a polyphase alternating current of constant energy may be converted into a single phase high frequency current of substantially constant amplitude.

The varying electro-magnetic field, in accordance with the invention, may be series or shunt excited from the same source of alternating current as the low frequency current feeding the arc. Of course, it may be energized from a separate auxiliary source provided that source is maintained in proper phase with the alternating current supplied to the arc.

The application of the invention to arc signaling systems, as well as other applications and features thereof will be understood from the following description, taken in conjunction with the accompanying drawings, in which.

It will be understood that when a "delta" or Y connected magnetic circuit is referred to, it is not intended to indicate the connection of the exciting windings of the several magnetic fields, but rather to indicate the relation of the magnetic flux paths to one another. When, however, "delta" or Y connected electric or arc circuits are referred to, it is intended to indicate the relation of the currents passing through the arcs.

Figure 1:
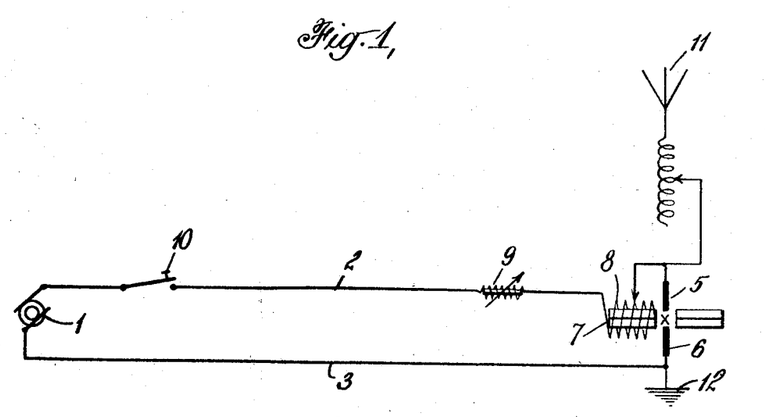
Fig. 1 illustrates a single arc converter fed by single phase alternating current.

Referring now to Fig. 1, the operation of the single arc converter of this invention will be first considered. The alternating current of proper frequency adapted to be supplied to the arc may be considered to be generated by the alternator 1. The generated electromotive force is then impressed upon the single pair of metallic electrodes 5, 6 connected in the circuit 2, 3. The potential so applied may be assumed to have the form of a sine wave and if the value of this electromotive force is sufficiently high, and the metallic electrodes 5 and 6 suitably spaced, an arc will be automatically established, the magnetic blow-out field produced by the electro-magnet 7 being of zero value at the instant previous to the starting of the arc. The arc once started causes the flow of current through the magnetizing winding 8 which is in series therewith. The winding is adjustable in order that a proper value of magnetic field strength may be obtained. The variable reactance 9 may be utilized to control the reactance of the circuit 2, 3 and to compensate for the adjustment of the magnetizing winding 8, that is, the variable reactance 9 provides a ready means for maintaining the total reactance of the circuit constant. The intensity of the magnetic field across the arc produced by the winding 8 will then vary synchronously with the current through the arc. As the arc supply current passes through zero, the blow-out field likewise becomes of zero value and as the electromotive force across the arc increases in the opposite direction in passing through the succeeding low frequency alternation, the arc is automatically re-ignited and the varying electro-magnetic field reestablished in the opposite direction. It will, therefore, be understood that the metallic electrodes 5 and 6 will not be subject to deformation since the polarity of these electrodes is constantly changing and each of them is negative for such a relatively short period of time that no appreciable disintegration can take place.

The alternating current supply may be broken by means of the signaling key 10 in order that the high frequency current produced by the arc associated with the antenna ground system 11, 12, may be radiated in accordance with the telegraphic codes ordinarily used.

Figure 2:
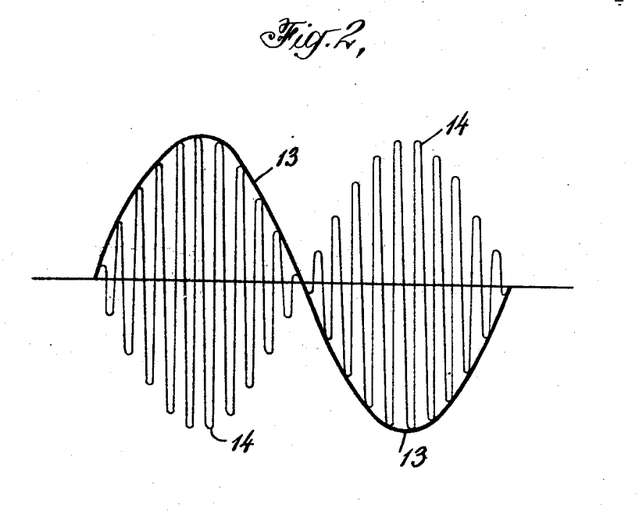
Fig. 2 is a conventional representation of the high frequency current produced by the arrangement of Fig. 1.

In Fig. 2 there is illustrated conventionally the generated high frequency currents produced during a complete cycle of the low frequency alternating current feeding the arc. The curve 13 may be considered to represent the low frequency current supplied to the single arc converter unit during a complete cycle and the curve 14 may be considered to represent the high frequency current produced by the arc in the course of its conversion of the low frequency alternating current through a complete cycle. The curve 14 also represents the current supplied to the antenna earth radiating system. It will be noted that the high frequency current is modulated or varied in accordance with the low frequency current feeding the arc.

Where a single converter unit operating in a radio signaling system is used, fed from a single phase alternating current supply, the wave form of the applied voltage and the resultant radio frequency current is of relatively slight importance. It may be desirable, however, to utilize a source of low frequency alternating current supply of a frequency of such value that advantage may be taken of its inherent characteristics in connection with the reception of the high frequency oscillations modulated or varied at that frequency. For example, it may be desirable to use a 500 cycle source of supply whereby not only the advantages and efficiency of an arc signaling system may be obtained, but also the advantages of variations in radiation at this frequency.

When it is desired, however, to combine a plurality of single converter units so as to operate the system as a polyphase system, either by combining the units in a unitary apparatus, or by using suitably interconnected units, the wave form of the applied electromotive forces and the resultant wave form of the radio frequency currents are of greater importance, and preferably should be of such form as to obtain a proper additive result.

Figure 3:
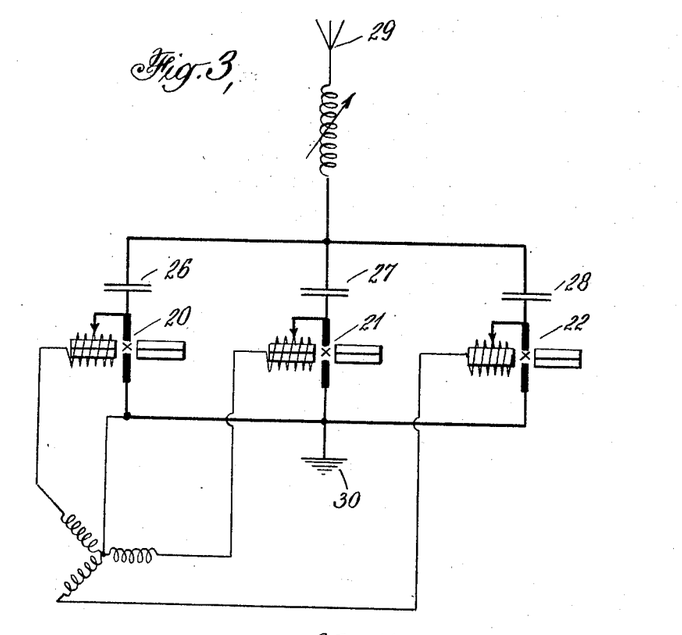
Fig. 3 illustrates an arc converter arrangement having three arcs each fed by one phase of the respective phases of a three-phase alternating current.
Figure 4:
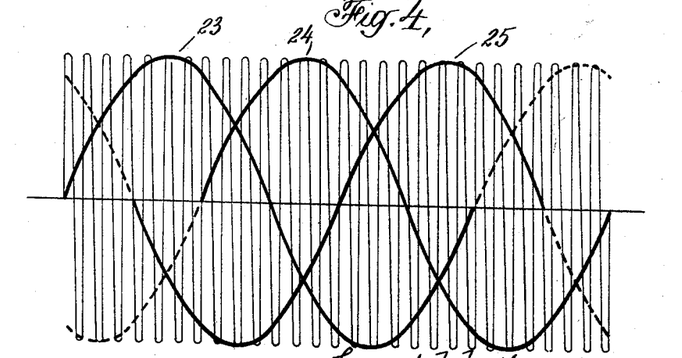
Fig. 4 is a conventional representation of the high frequency continuous oscillations produced by the arrangement of Fig. 3 or equivalent arrangements.

In Fig. 3 each of the arc converters 20, 21 and 22 may be assumed to be fed, for example, by the current represented by the curves 23, 24 and 25 of Fig. 4, the curves being conventional representations of the three currents existing in the three-phase alternating current source of supply. There will thus be produced three separate groups of radio frequency oscillations differing in amplitude-phase from one another by 120 degrees, but held in time-phase with one another by phasing devices such as the condensers 26, 27 and 28, or by other phasing means as will be pointed out hereinafter. There will, therefore, be produced in the antenna earth system 29—30 a summation resulting in the radiation of continuous high frequency oscillations of substantially constant amplitude.

In high power arc signaling installations with average values of antenna resistance, substantially no difficulties will be encountered in obtaining automatic or self-ignition of the arc for signaling purposes. If the power is reduced, however, or in lower power installations having abnormal values of antenna resistance, it may be that automatic ignition of the arc will be difficult to obtain, or the arc may be unstable in operation when once ignited. In either of these events it will be advantageous to employ auxiliary apparatus to provide either ignition or stabilization, or both; for example, the ignition or stabilizing systems of Figs. 5 and 6 may be advantageously employed.

Figure 5:
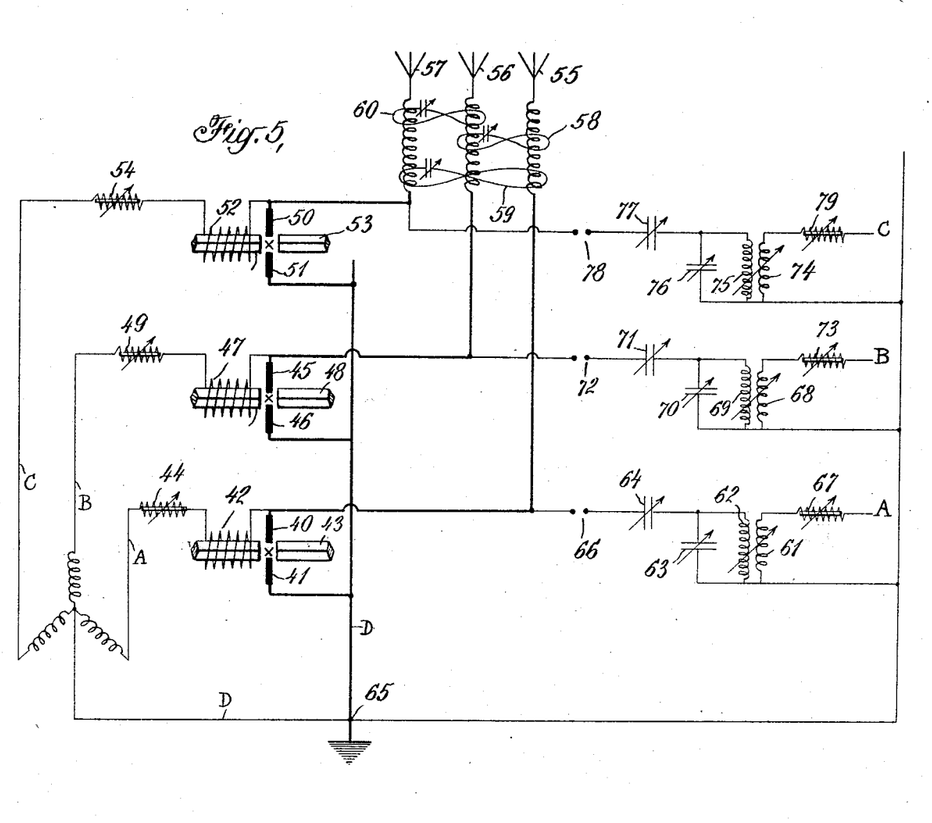
Fig. 5 illustrates an arc converter system in which the arc electric supply circuits are operated in Y connection, and in which auxiliary ignition or stabilizing means are embodied.

In Fig. 5, a three-phase Y-connected source of supply is shown connected to the three-phase buses A, B and C. The neutral point of the Y is grounded through the ground bus D. Connected across the phase A and the ground bus D are the arc electrodes 40, 41 and associated with them are the magnetic blow-out poles 42, 43. The magnetic blow-out field is series excited through the control reactance 44. In a similar manner, arc electrodes 45, 46 are connected between the bus B and the ground bus D, and its magnetic blow-out poles 47, 48 are series excited by a circuit passing through the control reactance 49. Arc electrodes 50, 51 are connected across bus C and ground bus D, the magnetic blow-out poles 52, 53 being series excited through the controlling reactance 54.

The arc converter arrangement of Fig. 5 is shown in a radio signaling system having the three pairs of arc electrodes 40—41, 45—46 and 50—51 connected to a radiating system comprising three separate antennas 55, 56 and 57. Suitable means for maintaining the high frequency currents in phase may be provided such as the linking loop circuits 58, 59 and 60. It will be understood, however, that any other suitable means for maintaining the phase relationship of the high frequency oscillations may be used.

The auxiliary ignition or stabilizing apparatus illustrated in Fig. 5 comprises a number of similar circuits equal to the number of arcs with which they are adapted to operate and with which they are properly phased. The circuits may be duplicates of one another and include for the arc electrodes 40, 41 the primary of a transformer 61 connected across phase A and the ground bus D, a secondary 62 which is associated with the two condensers 63—64 and connected to the ground bus D at 65.

Connected to the circuit including the secondary 62 of the transformer and in series with the condenser 64 is a spark gap 66, which is connected to the arc electrodes 40, 41 and through the said electrodes to the ground bus D. The power and phase, with relation to source of supply, of the discharge across the spark gap 66 may be controlled by the control reactance 67. Similar circuits are provided for the electrodes 45, 46, including the transformer primary 68, transformer secondary 69, condensers 70 and 71 and spark gap 72 and controlling reactance 73; for the electrodes 50, 51, the transformer primary 74, the transformer secondary 75, condensers 76 and 77, spark gap 78 and control reactance 79.

The operation of the ignition or stabilizing circuit takes place substantially as follows: The primary of the transformer 61 is supplied with alternating current from the phase A, its phase and value being regulated by the control reactance 67. The electromotive force of this current is then stepped up by the transformer 61, 62 and the condenser 63 is charged. Upon the discharge of condenser 63 a spark will jump across the gap 66 and across the electrodes 40, 41, thereby igniting the arc. This discharge path including the arc electrodes 40, 41 is the only one available, since the high frequency current will not pass through the windings of the magnet poles 42, 43. Since the condensers 63, 64 are of small capacity it is impossible for the alternating current supply of the arc to maintain a power arc across the spark gap 66 through the igniting circuit to ground.

Figure 6:
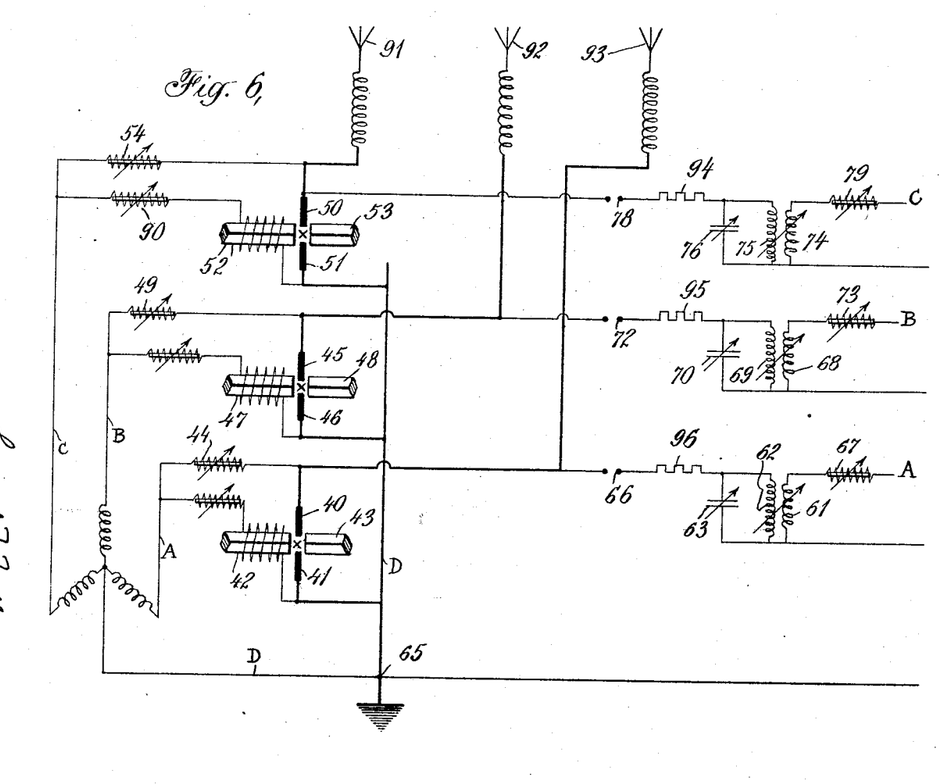
Fig. 6 illustrates an arc converter system similar to that of Fig. 5, but having the magnet windings operating in shunt with the arc circuit.

In Fig. 6 the magnetic circuit of the arc 50—51 is shunt excited by means of the circuit passing from the bus C through the controlling reactance 90, about the magnet pole 52, and connected to the grounded neutral bus D. The other arcs and magnetic circuits are connected similarly. The three arcs supply separate radiating systems 91, 92 and 93, it being understood that the constants of the oscillating circuits may be varied to secure a different frequency of the wave emitted from each of the radiating systems so that triplex transmission may be accomplished if desired, it being further understood that the antennæ 91, 92 and 93 may be separated to sufficiently reduce the electrostatic coupling which would otherwise exist between the respective proximate antenna.

In the ignition or stabilizing system of Fig. 6, the high resistances 94, 95 and 96 are substituted for the condensers 77, 71, and 64 respectively. This substitution, however, does not change the general mode of operation of the ignition or stabilizing system as described in connection with Fig. 5.

Figures 7, 8:
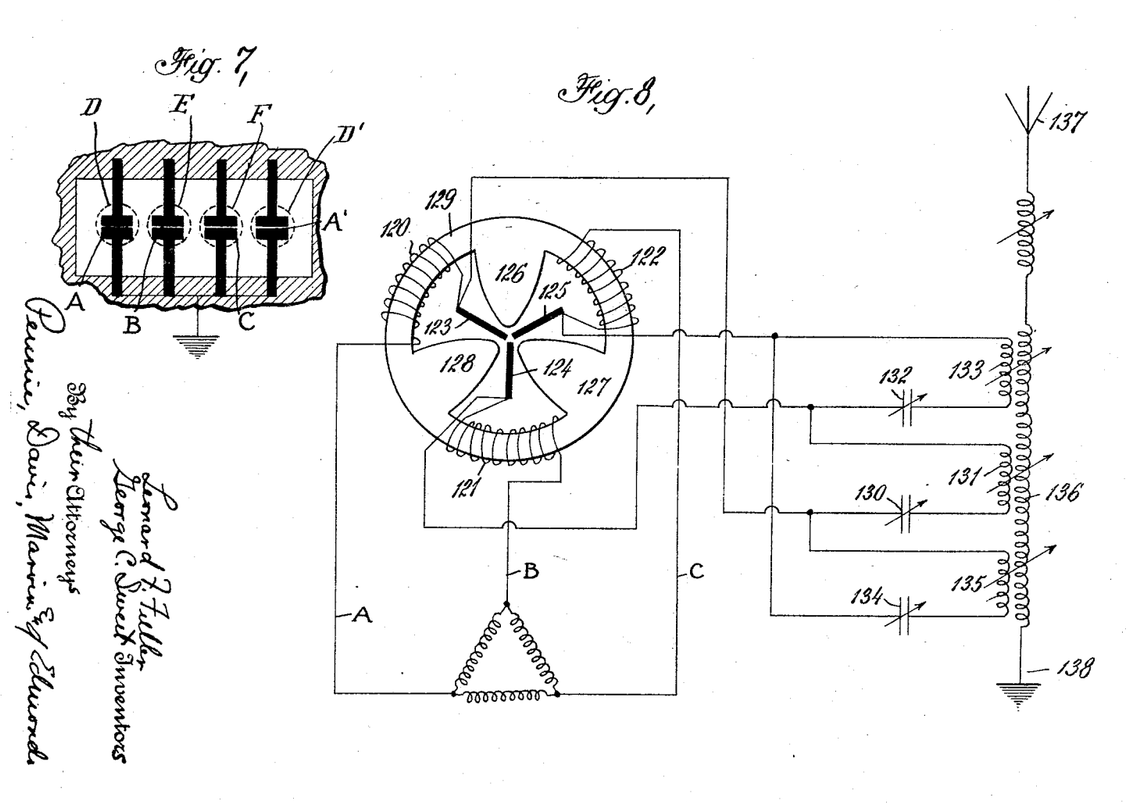
Fig. 7 illustrates an arrangement of metallic electrodes adapted to be operated on several single phases, placed in the same arc chamber and adapted to be fed by a polyphase source of supply whereby the arcs may stabilize the operation of one another.
Fig. 8 illustrates a unitary arc converter structure and system adapted to be operated by means of a three-phase alternating current, and in which the three-phase current is used both to provide variable magnetic fields and current through the several arcs, both the magnetic and electric circuits operating in "delta" connection.

If it is desired to stabilize the arcs when operated at low power continuously, by means of their own flames, the arcs may be arranged in one chamber as shown in Fig. 7. It will be understood that in this arrangement the arcs A, B and C, together with their blow-out fields D, E and F, respectively, are connected in any suitable manner to the phases A, B and C of the the source of polyphase current supply, for instance, as shown in Figures 3, 5 and 6, and that the arc A' and its field D' is also connected to the phase A of the source of low frequency alternating current. By thus connecting the arcs it is possible to cause one arc to ignite its neighbor so that re-ignition of each of the arcs is produced as its power supply current passes through zero. The relative directions of the arc currents and blow-out fields may be so arranged that arc A blows toward arc B, arc B toward arc A, arc C toward arc A' and arc A' toward arc C. With this arrangement the arcs should be enclosed in a single arc chamber and arranged in suitable proximity to one another to obtain the ignition of one arc by another. The connections of the magnetic field of each arc are to the phase from which each arc is supplied, as explained in connection with Figs. 3, 5 and 6, so that the variation in the respective magnetic fields takes place substantially synchronously with the current through each arc.

In Fig. 8 an arrangement of arc converter is illustrated embodying a circular arrangement of the electrodes, in which the arcs are fed from a three-phase delta-connected source of alternating current supply, both the magnetic flux paths and the circuits of the currents passing through the arcs being delta-connected. This figure also discloses a third means of causing an addition of the radio frequency outputs of the several arcs.

The three phases of the alternating current source of supply shown in Fig. 8 are indicated by the letters A, B and C, phase A serving to excite the magnetizing winding 120, phase B serving to excite the magnetizing winding 121, and phase C serving to excite the magnetizing winding 122. Phase A is also connected to the arc electrode 123; phase B is connected to the arc electrode 124, and phase C is connected to the arc electrode 125. The magnetizing windings may be located on the pole pieces 126, 127, 128 of the magnet instead of on the ring 129 forming the magnetic circuit.

Each pair of electrodes is connected to a primary circuit comprising a variable inductance and variable capacity which permits of their being tuned to any desired frequency. The arc electrodes 123—124 are thus connected through condenser 130 and inductance 131; the arc electrodes 124—125 are connected through variable condenser 132 and variable inductance 133, and the arc electrodes 123—125 are connected through the variable condenser 134 and variable inductance 135. The arrangement of these primary circuits is such that there is substantially no direct transfer of energy between them by mutual inductance or otherwise. They are, however, associated with a common secondary 136 in the antenna earth system 137, 138.

By making a slight modification of the arrangement shown in Fig. 8, it is possible to utilize an arc converter in accordance with our invention so that the magnetizing flux paths are delta-connected and the circuits of the current passing through the arcs are Y-connected. This involves the introduction between the arc electrodes of a common neutral electrode 150 illustrated in Fig. 9. The arcs in this arrangement play between each of the several electrodes 151, 152, 153 and the common electrode 150 instead of between one another as in the arrangement described in connection with Fig. 8. The circuit connections have not been illustrated in Fig. 9 since any of the arrangements shown in the previous figures utilizing a polyphase alternating current source of supply may be used.

It should be understood that when a plurality of arcs supplied with polyphase alternating current are arranged in one unitary structure in accordance with the invention, the arc converter will have two coacting fields, one electro-static and the other electro-magnetic, both of which fields rotate at the same frequency and vary synchronously. The electrostatic field of the arc, however, is at the same time effected by the radio frequency as determined by the arc circuit constants. By the expression, rotating static field of the arc, it should be understood that the rotation of the line of maximum potential difference between arc electrodes as compared to the power supplied, is referred to.

Figures 9, 10, 11, 12:
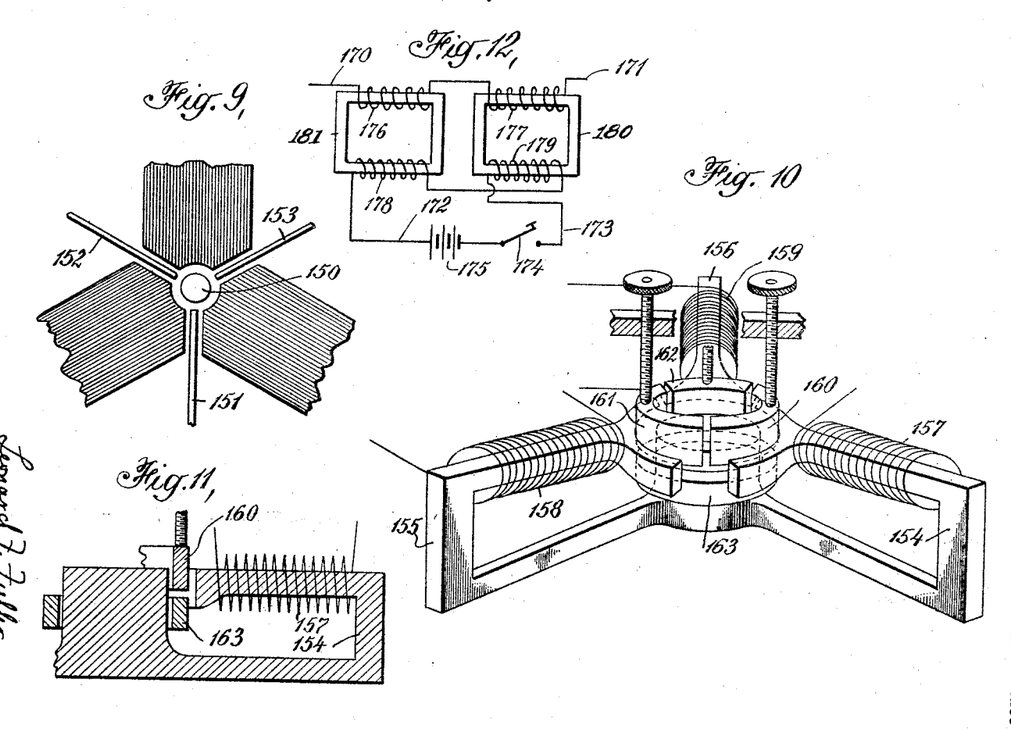
Fig. 9 illustrates an arc converter in which the magnetic circuit may be "delta" connected and the polyphase arc currents may be in Y relation.
Fig. 10 illustrates a converter in accordance with the invention, whereby both the magnetic and electric arc circuits may be operated in Y relation.
Fig. 11 is a partial cross section in a vertical plane through one of the magnetic circuits of the converter shown in Fig. 10, and its associated parts.
Fig. 12 illustrates one form of control which may be used in the supply circuit or circuits of any of the foregoing arc converter signaling systems for the purpose of controlling the signaling energy in accordance with the usual telegraphic codes.

Figure 10 and 11 illustrate a construction which may be employed in accordance with the invention and in which both the magnetic circuits and the circuits of the currents through the arcs may be Y-connected. This type of arc converter comprises three magnetic circuits 154, 155, 156, each carrying a winding 157, 158, 159, each of the windings being excited by one of the phases of the polyphase alternating current source of supply. The arc electrodes may comprise movable metallic electrodes 160, 161, 162 and a stationary electrode which may take the form of a ring 163.

With the construction illustrated in Fig. 10, advantage may be taken of the effect of the rotating magnetic field so that the arc is moved continuously about the circle of the electrodes and provides a convenient ignition or stabilizing means. In this connection it is to be noted that in Fig. 8 the magnetic field is at right angles to the plane of the arcs and, therefore, plays no part in the ignition or stabilization of the arc in that arrangement.

The electrical connections to be used with the arc converter of Fig. 10 may be those illustrated in Figs. 3, 5 and 6 or any other connections employing a polyphase alternating current of supply whereby both the magnetic circuits and the circuits of the currents through the arcs may be Y-connected.

While no specific means for signaling have been illustrated or described in connection with any of the foregoing drawings with the exception of Fig. 1, it will be understood that any convenient known means of control may be used. One type of control which may be used advantageously in conjunction with any of the above-described arc converter signaling systems embodying the invention, is shown in Fig. 12.

In order that the application of this control means may be readily understood, its application to the single phase single arc arrangement of Fig. 1 will be described. If used in that arrangement the circuit 170—171 would be connected in series with the lead 2 in place of the key 10. With the device 180—181 so connected the alternating current supplied to the arc 5, 6 of Fig. 1 will be varied in accordance with the making and breaking of the circuit 172—173 containing the battery 175. The battery 175 serves to energize the windings 178—179, the winding 179 being reversed, and in so doing changes the magnetic condition of the cores 154—155 carrying the windings 176—177 through which the current supplied to the arc flows. The variation in the magnetic condition of the cores varies the current flow through the windings 176—177 and therefore the current supplied to the arc. It will, therefore, be seen that the key 174 effectively controls the current supplied to the arc in accordance with the usual telegraphic signals produced by its manipulation. The application of the control means illustrated in Fig. 12 to the arrangements shown in the other drawings will be obvious from this description.

It should be understood that while the various figures of the drawings illustrate embodiments of the invention in which only single phase and three-phase sources of supply are utilized, other sources of alternating or pulsating current may be employed having any convenient number of phases to supply the proper number of arcs, one or more in each phase.

It will also be noted that in the foregoing description of the drawings, no specific mention is made of providing laminated pole pieces for the electro-magnets producing the varying magnetic fields across the arcs. By reference to Fig. 9 it will be understood that similarly laminated pole pieces may be employed in the various arc converter arrangements diagrammatically illustrated in the drawings.

While the use of metallic electrodes has been emphasized, it will, of course, be understood that wherever the arrangements will permit it, carbon electrodes may be employed.

It has already been pointed out that a chamber atmosphere of steam may be used to advantage with an arc embodying this invention provided with metallic electrodes, but it should also be understood that any wellknown chamber atmosphere may be employed including carbon disulfide ($CS_2$), carbon tetrachloride ($CCl_4$), and the like.

It will be understood that the various embodiments shown are intended to be illustrative only and it will be obvious that many modifications may be made without departing from the spirit of our invention.

We claim:—

1. An arc signaling system comprising a source of polyphase alternating current, a plurality of arcs each operable on one phase of said source individually, means for producing a plurality of magnetic fields each of said fields being associated with one of said arcs and adapted to be energized by the current feeding its associated arcs, each of said arcs being subjected to the action of its associated magnetic field, a plurality of antennæ each individually and operatively associated with one of said arcs, said antennæ being adapted to cooperate in the transmission of high frequency signals, and means for producing spark discharges across the arc-gaps for igniting said arcs.

2. An arc signaling system comprising a source of polyphase alternating current, a plurality of arc discharge paths each fed by one branch of said source individually whereby the arc discharges occur in phase relation corresponding to the phases of said source, means for producing a plurality of magnetic blowout fields, each of said fields being associated with one of said discharge paths individually and adapted to be energized by the current feeding its associated discharge path, a plurality of antennæ each operatively associated with one of said arc discharge paths individually, said antennæ being adapted to cooperate in the transmission of high frequency signals, a plurality of arc ignition circuits each individual to one of said arc discharge paths and including a spark-gap in series with said arc discharge path, and means for converting relatively low tension electrical energy from said polyphase source into high tension electrical energy and for impressing the high tension energy on said ignition circuits, the arrangements being such that the arcs are ignited by the spark discharges thereacross, and extinguished by the magnetic blowout fields at rates corresponding to the frequency of the alternating current arc supply.

In testimony whereof we affix our signatures.

LEONARD F. FULLER.
GEORGE C. SWEET.